United States Patent
Dienst et al.

(10) Patent No.: US 12,207,590 B2
(45) Date of Patent: Jan. 28, 2025

(54) MODULAR AGRICULTURAL PLANTER

(71) Applicant: CNH Industrial America LLC, New Holland, PA (US)

(72) Inventors: Johnathon Raymond Dienst, Maple Park, IL (US); Michael J. Connors, Lockport, IL (US); Brian John Anderson, Yorkville, IL (US); Nathan Folger, Chillicothe, IL (US); Clayton J. Hamilton, Bloomington, IL (US)

(*) Notice: Subject to any disclaimer, the term of this patent is extended or adjusted under 35 U.S.C. 154(b) by 303 days.

(21) Appl. No.: 17/715,601

(22) Filed: Apr. 7, 2022

(65) Prior Publication Data
US 2023/0320258 A1   Oct. 12, 2023

(51) Int. Cl.
A01C 7/20   (2006.01)
A01B 59/043   (2006.01)
A01B 59/06   (2006.01)

(52) U.S. Cl.
CPC ............ *A01C 7/208* (2013.01); *A01B 59/043* (2013.01); *A01B 59/066* (2013.01)

(58) Field of Classification Search
CPC .............................. A01B 59/043; A01C 7/208
See application file for complete search history.

(56) References Cited

U.S. PATENT DOCUMENTS

| | | | | |
|---|---|---|---|---|
| 3,716,253 A | * | 2/1973 | Gniffke | B60D 1/141 |
| | | | | 280/416.2 |
| 4,331,347 A | * | 5/1982 | Madden | B60D 1/26 |
| | | | | 172/1 |
| 6,257,347 B1 | | 7/2001 | Campisi | |
| 6,293,351 B1 | | 9/2001 | Schmidt | |
| 6,612,380 B2 | | 9/2003 | Pyle | |
| 7,547,033 B1 | | 6/2009 | Herbold | |
| 7,975,776 B2 | | 7/2011 | Chimento et al. | |
| 9,021,968 B2 | * | 5/2015 | Blunier | A01C 23/008 |
| | | | | 111/121 |
| 10,813,279 B2 | * | 10/2020 | Dienst | A01C 15/006 |

(Continued)

FOREIGN PATENT DOCUMENTS

| | | | | |
|---|---|---|---|---|
| EP | 1199194 A2 | * | 4/2002 | ........... A01B 59/043 |
| FR | 2701803 A1 | * | 9/1994 | ............. A01B 49/06 |
| WO | WO-2021113165 A1 | * | 6/2021 | ........... A01B 59/004 |

OTHER PUBLICATIONS

Burch Store Tractors, New Farmall 1 Point Fast Hitch to 3 Point Hitch Equipment Adapter for IH Farmall 140, 130, Super A, and 100 Tractors, https://burchstoretractors.com/products/new-1-point-fast-hitch-to-3-point-hitch-conversion-for-farmall-140-130-super-a-100-tractors-USA-made, Nov. 16, 2021, 4 pgs.

(Continued)

*Primary Examiner* — Adam J Behrens
*Assistant Examiner* — Ashley A Kaercher
(74) *Attorney, Agent, or Firm* — Rebecca Henkel; Peter K. Zacharias; Rickard K. DeMille

(57) ABSTRACT

An agricultural implement includes a fertilizer section. The fertilizer section includes a first interface configured to engage a three-point hitch, and a second interface configured to engage an interface of a planter section. Further, the interface of the planter section is configured to engage the three-point hitch. The second interface includes multiple plates, and each of the plates includes at least one opening configured to receive a connector to connect the second interface to the interface of the planter section.

15 Claims, 8 Drawing Sheets

(56) References Cited

U.S. PATENT DOCUMENTS

| | | | |
|---|---|---|---|
| 11,930,727 B1* | 3/2024 | Magarin | A01B 63/32 |
| 2006/0082099 A1 | 4/2006 | Jwanouskos | |
| 2011/0147020 A1 | 6/2011 | Waltz et al. | |
| 2012/0261899 A1 | 10/2012 | Ockunzzi | |
| 2017/0006761 A1* | 1/2017 | Anderson | A01B 73/04 |
| 2017/0049039 A1 | 2/2017 | Houck | |
| 2017/0231147 A1* | 8/2017 | Fehr | B62D 49/065 |
| | | | 172/439 |
| 2021/0185893 A1* | 6/2021 | Johnson | A01C 7/20 |

OTHER PUBLICATIONS

Titan Attachments Receiver Hitch 2, https://www.amazon.com/Titan-Category-3-Point-Receiver-Compatible/dp/B07BWNC249, Nov. 16, 2021, 9 pgs.

Remlinger Manufacturing, PST Rigid Toolbars, https://www.remlingermfg.com/agricultural-products/stip-till/pst-rigid-toolbars/, Nov. 16, 2021, 4 pgs.

* cited by examiner

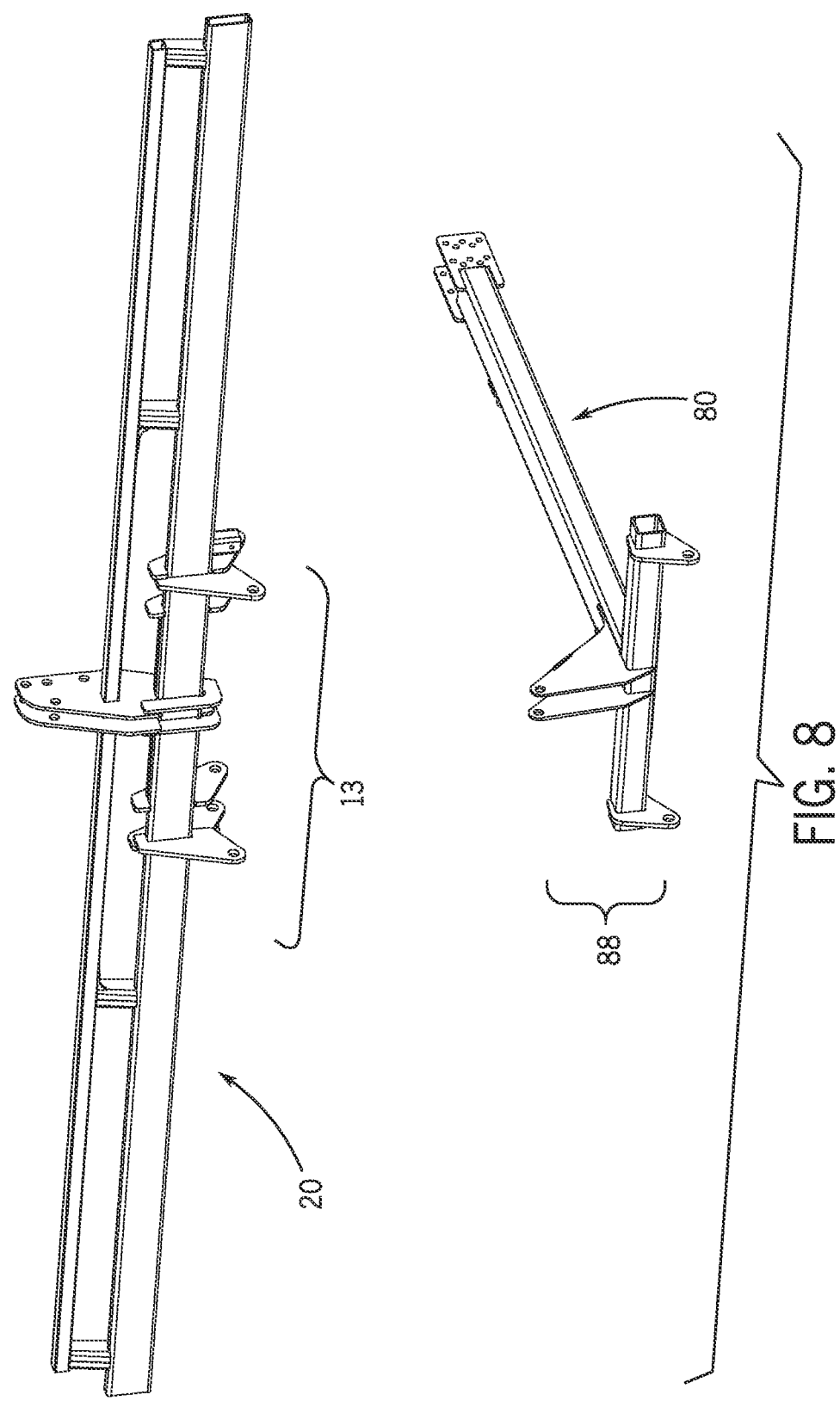

MODULAR AGRICULTURAL PLANTER

BACKGROUND

The present disclosure relates generally to a modular agricultural planter.

Generally, agricultural implements (e.g., fertilizers, planters, etc.) are towed behind a tractor or other work vehicle via a mounting device, such as a three-point hitch or a drawbar. Typically, the agricultural implements include one or more toolbars with row units attached, such as fertilizer applicators and/or planting row units, to perform certain agricultural operations within a field.

For example, certain planters are configured to couple to a three-point hitch of a work vehicle, while other planters are configured to couple to a drawbar of the work vehicle. Furthermore, certain planters include a frame that supports fertilizer row units, and other planters do not include a fertilizer row unit support frame. Accordingly, an operator may select one of a variety of planters for a particular planting operation. However, if the operator changes the type of planting operation being performed, the operator may utilize a different type of planter. Therefore, an operator may purchase multiple agricultural implements for various types of planting operations, thereby increasing the expense associated with the planting operations.

BRIEF DESCRIPTION

In certain embodiments, an agricultural implement includes a fertilizer section. The fertilizer section includes a first interface configured to engage a three-point hitch, and a second interface configured to engage an interface of a planter section. Further, the interface of the planter section is configured to engage the three-point hitch.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 8 is a perspective view of the fertilizer section and the drawbar connector of the agricultural implement of FIG. 1.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
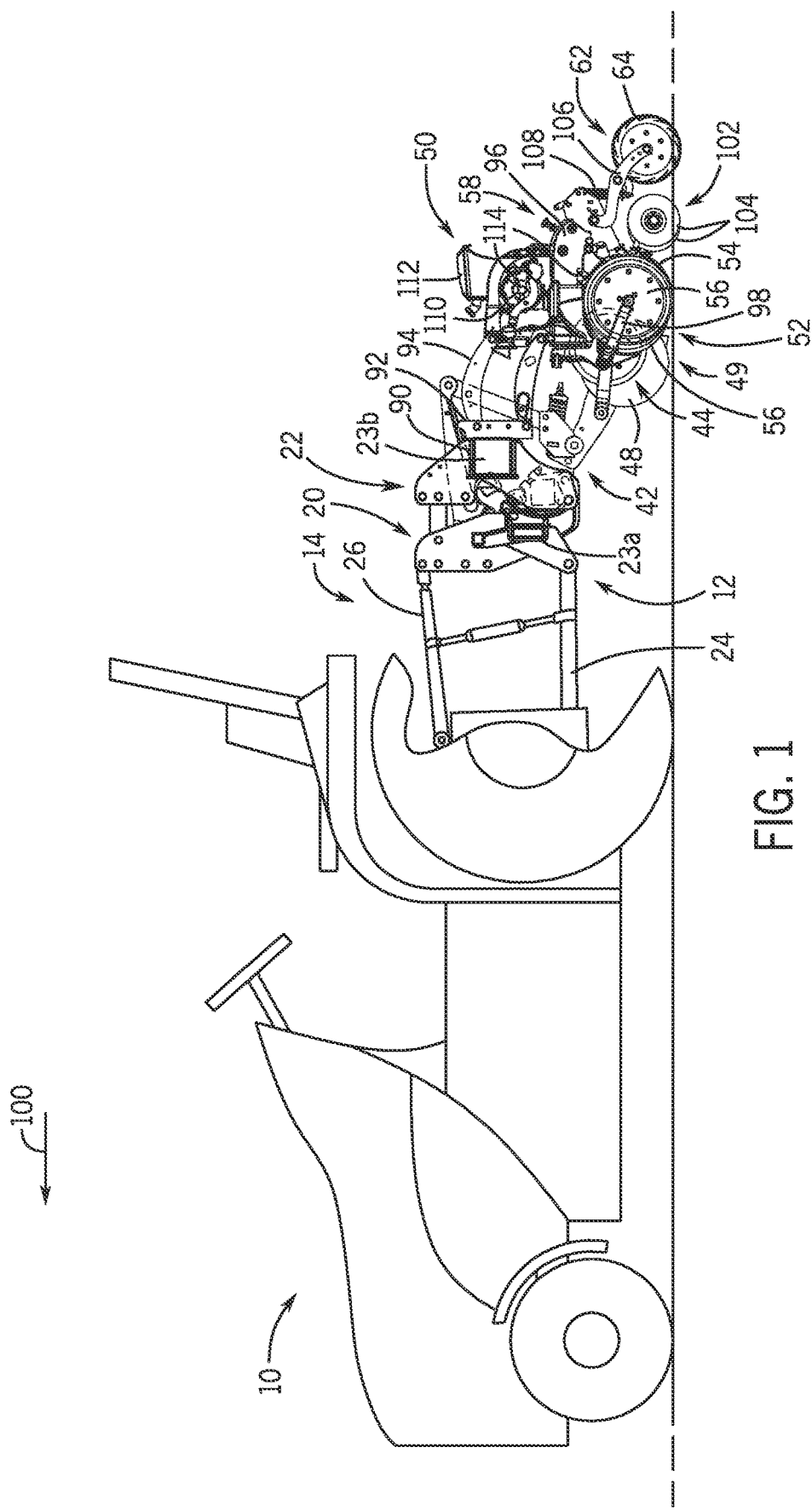
FIG. 1 is a side view of an embodiment of a work vehicle coupled to an embodiment of an agricultural implement via a three-point hitch.

FIG. 1 is a side view of an embodiment of a work vehicle coupled to an embodiment of an agricultural implement via a three-point hitch. The work vehicle 10 is configured to tow the agricultural implement 12 (e.g., through a field) along a direction of travel 100. In the illustrated embodiment, the work vehicle 10 is a tractor. However, in other embodiments, the work vehicle may be any other suitable type of work vehicle configured to tow an agricultural implement, such as a harvester or a sprayer. Furthermore, in the illustrated embodiment, the agricultural implement 12 includes a fertilizer section 20 and a planter section 22, which are coupled to one another. However, as discussed in detail below, the agricultural implement may be configured to omit the fertilizer section, or the agricultural implement may be configured to omit the planter section. Furthermore, the agricultural implement may be configured to include a drawbar connector, which is connectable to the fertilizer section and the planter section.

In the illustrated embodiment, the fertilizer section 20 includes a row of fertilizer applicators 42, which is coupled to a toolbar 23a of the fertilizer section 20. Each fertilizer applicator 42 is configured to deposit fertilizer at a target depth beneath the soil surface as the fertilizer applicator 42 traverses the field along the direction of travel 100. Each fertilizer applicator 42 includes an opener assembly 44 that forms a trench in the soil for fertilizer deposition into the soil. In the illustrated embodiment, the opener assembly 44 includes a gauge wheel 56 and a coulter disc 48. The coulter disc 48 is configured to excavate a trench into the soil, and the gauge wheel 46 is configured to control a penetration depth of the coulter disc 48 into the soil. In certain embodiments, each fertilizer applicator 42 includes an adjustment assembly configured to control the vertical position of the gauge wheel 46, thereby controlling the penetration depth of the coulter disc 48 into the soil. While each opener assembly 44 includes a coulter disc 48 and a gauge wheel 46 in the illustrated embodiment, in certain embodiments, at least one opener assembly may include other and/or additional suitable device(s) configured to form a trench within the soil, such as a knife, a shank, or an opener disc. Furthermore, each fertilizer applicator 42 includes a fertilizer tube 49 configured to deposit fertilizer into the trench formed by the coulter disc 48. In certain embodiments, the fertilizer tube 49 is positioned directly adjacent to the coulter disc 48 (e.g., within a scraper configured to remove soil from the coulter disc/widen the trench formed by the coulter disc).

In certain embodiments, the opener assembly and the fertilizer tube of at least one fertilizer applicator may be followed by a packer assembly configured to pack soil on top of the deposited fertilizer. The packer assembly may include a packer wheel configured to roll along the soil surface, thereby packing soil on top of the deposited fertilizer. Furthermore, in certain embodiments, at least one fertilizer applicator 42 may include a closing assembly (e.g., positioned between the opener assembly/fertilizer tube and the packer assembly along the direction of travel of the agricultural implement). The closing assembly may include one or more closing discs configured to direct displaced soil into the trench formed by the opener assembly, thereby covering the fertilizer with soil (e.g., before the soil is packed by the packer assembly).

The planter section 22 includes a row of row units 50 that each include a mount 90 configured to secure the row unit 50 to the tool bar 23b of the planter section 22. In the illustrated embodiment, the mount 90 includes a u-bolt that secures a bracket 92 of the row unit 50 to the tool bar 23b. However, in alternative embodiments, the mount may include another suitable device that couples the row unit to the tool bar. A linkage assembly 94 extends from the bracket 92 to a frame 96 of the row unit 50. The linkage assembly 94 is configured to enable vertical movement of the frame 96 relative to the tool bar in response to variations in a soil surface. In certain embodiments, a down pressure system (e.g., including a hydraulic actuator, a pneumatic actuator, etc.) may be coupled to the linkage assembly 94 and configured to urge the frame 96 toward the soil surface. While the illustrated linkage assembly 94 is a parallel linkage assembly (e.g., a four-bar linkage assembly), in alternative embodiments, another suitable linkage assembly may extend between the bracket and the frame.

The row units 50 are configured to deposit seeds at a target depth beneath the soil surface as the row units 50 traverse the field along the direction of travel 100. Each row unit 50 includes an opener assembly 52 that forms a trench in the soil for seed deposition into the soil. In the illustrated embodiment, the opener assembly 52 includes a gauge wheel 56, arms 98 that pivotally couple the gauge wheel 56 to the frame 96, and an opener disc 54. The opener disc 54 is configured to excavate a trench into the soil, and the gauge wheel 56 is configured to control a penetration depth of the opener disc 54 into the soil. Furthermore, in the illustrated embodiment, each row unit 50 includes an adjustment assembly 58 configured to control the vertical position of the gauge wheel 56, thereby controlling the penetration depth of the opener disc 54 into the soil. While each opener assembly 52 includes an opener disc 54 and a gauge wheel 56 in the illustrated embodiment, in certain embodiments, at least one opener assembly may include other and/or additional suitable device(s) configured to form a trench within the soil, such as a knife, a shank, or a coulter disc.

Each row unit 50 includes a seed tube configured to deposit seeds into the trench formed by the opener disc 54. In certain embodiments, a seed tube is positioned directly adjacent to the opener disc 54 (e.g., between the opener disc and a scraper 114 configured to remove soil from the opener disc/widen the trench formed by the opener disc). The opener assembly 52 and the agricultural product conveying system are followed by a closing assembly 102 that moves displaced soil back into the trench. In the illustrated embodiment, the closing assembly 102 includes two closing discs 104. However, in alternative embodiments, the closing assembly may include other closing devices (e.g., a single closing disc, etc.). In addition, in certain embodiments, the closing assembly may be omitted. In the illustrated embodiment, the closing assembly 102 is followed by a packer assembly 62 configured to pack soil on top of the deposited seeds. The packer assembly 62 includes a packer wheel 64 configured to roll along the soil surface, thereby packing soil on top of the deposited seeds. The packer assembly also includes an arm 106 that pivotally couples the packer wheel 64 to the frame 96, and a biasing member 108 configured to urge the packer wheel 64 toward the soul surface, thereby enabling the packer wheel to pack soil on top of the deposited seeds. While the illustrated biasing member 108 includes a spring, in alternative embodiments, the biasing member may include another suitable biasing device, such as a hydraulic cylinder or a pneumatic cylinder, among others.

The row unit 50 includes a vacuum seed meter 110 configured to receive agricultural product (e.g., seeds) from a hopper 112. In certain embodiments, the vacuum seed meter 110 includes a disc having multiple openings. An air pressure differential between opposite sides of the disc induces the agricultural product (e.g., seeds) to be captured within the openings. As the disc rotates, the agricultural product is conveyed toward a seed tube. When the agricultural product (e.g., seed) is aligned with an inlet to a seed tube, the air pressure on each side of the disc is substantially equalized (e.g., at the end of a vacuum passage), thereby enabling the agricultural product (e.g., seed) to enter a seed tube. A seed tube then directs the agricultural product to the trench. While the illustrated embodiment includes a vacuum seed meter, in alternative embodiments, other suitable seed/agricultural product meters may be utilized. As used herein, "vacuum" refers to an air pressure that is less than the ambient atmospheric air pressure, and not necessarily 0 pa.

Further, while the fertilizer section 20 is described above as having fertilizer applicators 42, in some embodiments, the fertilizer section 20 may include row units 50, or a combination of row units 50 and fertilizer applicators 42. Further, in some embodiments, the planter section 22 may include fertilizer applicators 42, row units 50, seeder units, or any other suitable type of row unit.

The agricultural implement 12 has a number of configurations that are possible due to the interchangeability of the drawbar connector 80, the fertilizer section 20, and the planter section 22. For instance, in a first configuration, the agricultural implement 12 is a three-point hitch/fertilizer combination, such the fertilizer section 20 couples directly to the three-point hitch 14 of the work vehicle 12. The fertilizer section 20 may optionally also be coupled to a planter section 22. In a second configuration, the agricultural implement 12 is a three-point hitch/planter combination, such the planter section 22 couples directly to the three-point hitch 14 of the work vehicle 10 and the fertilizer section 20 is omitted. In a third configuration, the agricultural implement 12 is a drawbar/fertilizer combination, such the fertilizer section 20 couples to the three-point hitch 14 of the work vehicle 10 via the drawbar connector 80. In some embodiments, the fertilizer section 20 may also couple to the planter section 22 in this configuration. In a fourth configuration, the agricultural implement 12 is a drawbar/planter combination, such the planter section 22 couples to the three-point hitch 14 of the work vehicle 10 via the drawbar connector 80. The flexibility of the agricultural implement 12 enables an operator to utilize the agricultural implement 12 for a variety of agricultural needs, and avoid the increased expenses associated with purchasing multiple agricultural implements to perform similar tasks.

Figure 2:
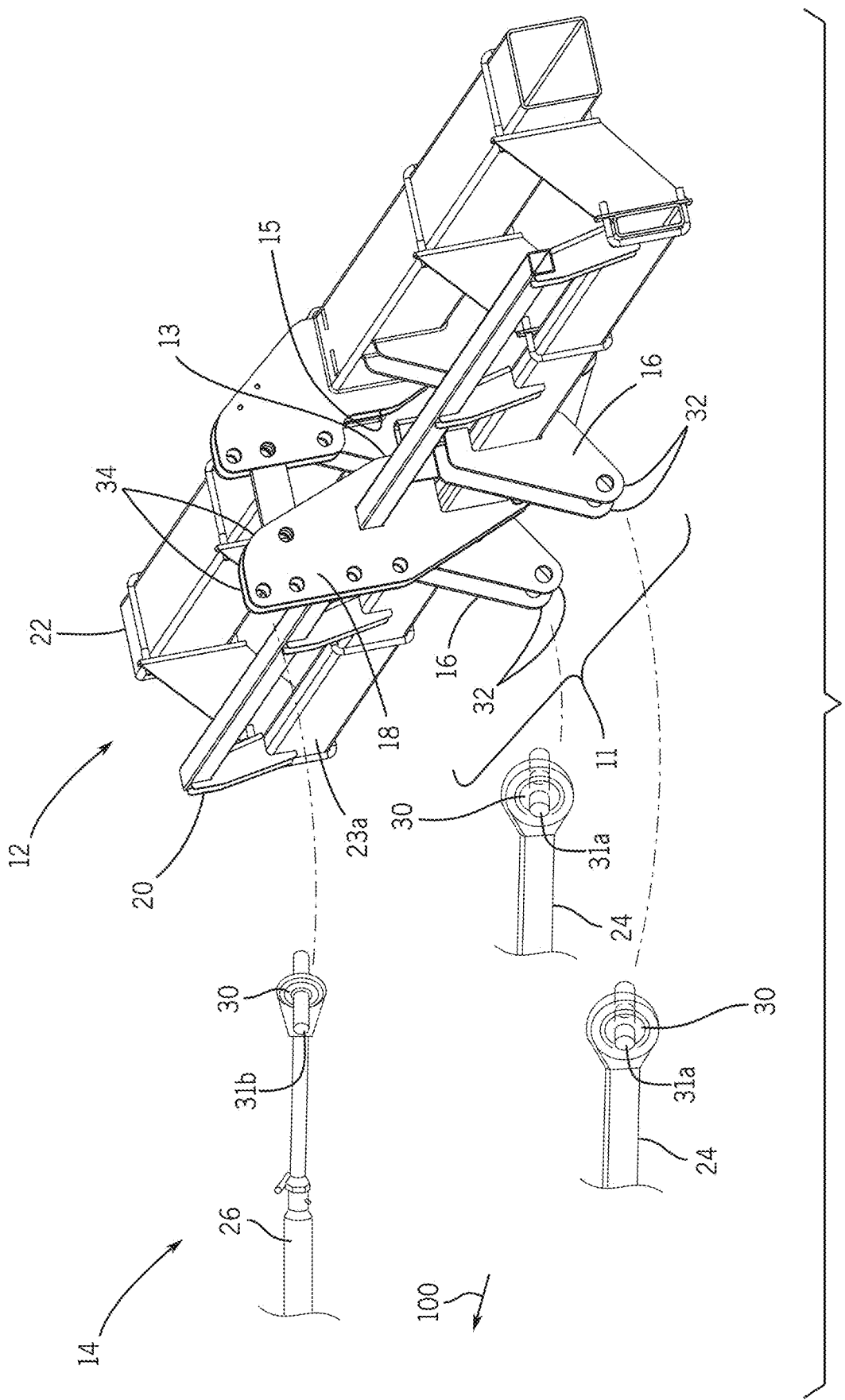
FIG. 2 is a perspective view of the three-point hitch of FIG. 1 and the agricultural implement of FIG. 1.

FIG. 2 is a perspective view of the three-point hitch 14 of FIG. 1 and the agricultural implement 12 of FIG. 1. In the illustrated embodiment, the agricultural implement 12 is coupled to the work vehicle via the three-point hitch 14 of the work vehicle. As illustrated, the three-point hitch 14 includes two lower lift arms 24 and an upper link 26. The two lower lift arms 24 and the upper link 26 are coupled (e.g., rotatably coupled) to a chassis of the work vehicle. In certain embodiments, an actuator is coupled to the lower lift arms and configured to drive the lower lift arms to rotate relative to the chassis of the work vehicle. Each lower lift arm 24 includes an opening 30 configured to receive a corresponding lower hitch pin 31a, which couples the lower lift arm 24 to the agricultural implement 12, and the upper link 26 includes an opening 30 configured to receive a corresponding upper hitch pin 31b, which couples the upper link 26 to the agricultural implement 12. Accordingly, the hitch pins 31a and 31b couple the agricultural implement 12 to the work vehicle.

With the agricultural implement 12 in the illustrated three-point hitch/fertilizer configuration, the fertilizer section 20 of the agricultural implement 12 engages the three-point hitch 14 of the work vehicle via an interface (e.g., first interface) 11 of the fertilizer section, which includes lower hitch connectors 16 and an upper hitch connector 18. In the illustrated embodiment, each lower hitch connector 16 includes a pair of vertically oriented parallel plates 32 extending from the toolbar 23a of the fertilizer section 20. The parallel plates 32 form a slot configured to receive an end of a respective lower lift arm. In addition, each plate 32 of the lower hitch connectors 16 includes an opening 30 configured to receive a lower hitch pin 31a, thereby connecting the lower hitch connectors 16 to the lower lift arms 24. The upper hitch connector 18 also includes a pair of vertically oriented parallel plates 34 extending from the toolbar 23a of the fertilizer section 20. The parallel plates 34 form a slot configured to receive an end of the upper link 26. In addition, each plate 34 of the upper hitch connector 18 includes an opening 30 configured to receive the upper hitch pin 31b. While each connector includes a pair of vertically oriented parallel plates in the illustrated embodiment, in other embodiments, at least one connector may include a single plate, and/or at least one connector may include three or more plates. Furthermore, while the hitch pins couple the lower lift arms and the upper link to the connectors in the illustrated embodiment, in other embodiments, the upper link and/or at least one lower lift arm may be coupled to the respective connector(s) via bolt(s), screw(s), or the like, which fasten the fertilizer section 20 to the three-point hitch 14.

As discussed in detail below, the fertilizer section 20 includes another interface (e.g., second interface) 13 configured to engage an interface 15 of the planter section 22, thereby coupling the planter section 22 to the fertilizer section 20. The interface 15 of the planter section 22 is configured to engage the three-point hitch. Accordingly, the agricultural implement 12 may be reconfigured into the three-point hitch/planter configuration by removing the fertilizer section 20 from the agricultural implement 12. With the agricultural implement 12 in the three-point hitch/planter configuration, the planter section 22 of the agricultural implement 12 may directly engage the three-point hitch 14 of the work vehicle via the interface 15 of the planter section 22. Because the agricultural implement 12 can be configured to use the fertilizer section 20 or not, the agricultural implement 12 may remove a need to buy and maintain a separate fertilizer tool and planter tool, saving money and convenience. Further, in some embodiments, multiple fertilizer sections may be coupled to one another via respective first and second interfaces of the fertilizer sections (e.g., with the front fertilizer section coupled to the three-point hitch via the first interface and the rear fertilizer section coupled to the planter section by the second interface). In addition, in certain embodiments, the planter section may include a second interface configured to engage a first interface of a fertilizer section and/or another planter section. Accordingly, the agricultural implement may be configured in a variety of configurations having any suitable number of planter sections and/or any suitable number of fertilizer sections arranged in any suitable order (e.g., front to back along the direction of travel).

Figure 3:
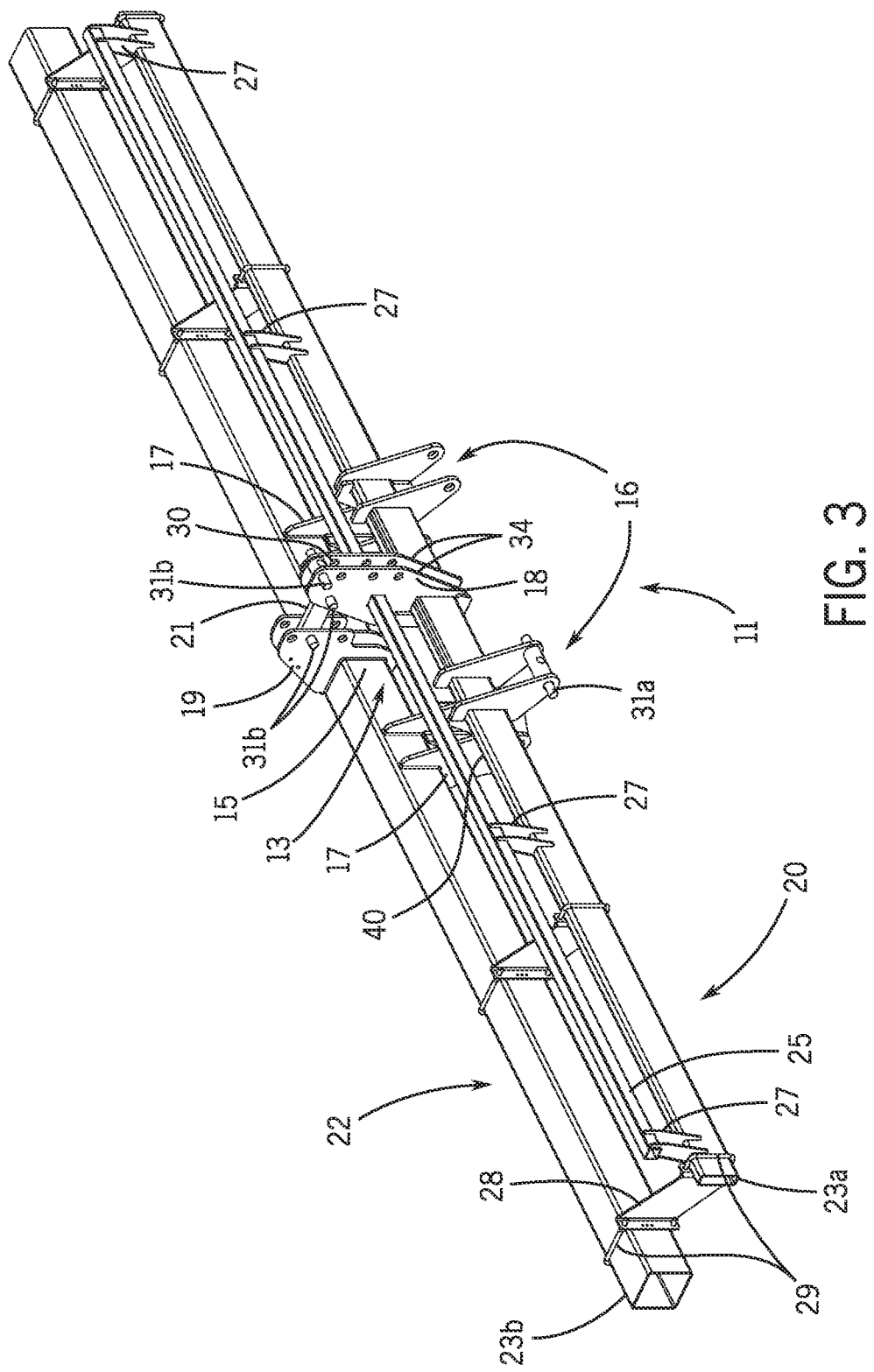
FIG. 3 is a perspective view of the agricultural implement of FIG. 1, in which the agricultural implement includes a fertilizer section and a planter section.

FIG. 3 is a perspective view of the agricultural implement 12 of FIG. 1, in which the agricultural implement includes the fertilizer section 20 and the planter section 22. As illustrated, the agricultural implement 12 is in the three-point hitch/fertilizer configuration. In the illustrated embodiment, the fertilizer section 20 includes the toolbar 23a and a support bar 25, which are horizontally parallel to one another. The two lower hitch connectors 16 are coupled to the toolbar 23a. In addition, the two lower hitch connectors 16 are located on opposite sides of the upper hitch connector 18 and are spaced apart from one another, such that the lower hitch connectors 16 are able to engage the lower lift arms of the three-point hitch. The upper hitch connector 18 is coupled to the toolbar 23a and the support bar 25, and the upper hitch connector 18 extends vertically, such that the upper hitch connector 18 is able to engage the upper link of the three-point hitch. The toolbar 23a connects to the support bar 25 via supports 27, which establish a space between the two bars along their longitudinal axes. Although the fertilizer section includes four supports in the illustrated embodiment, in other embodiments, the fertilizer section may include more or fewer (e.g., 1, 2, 3, 4, 5, 6, 7, 8, 9, 10, or more) supports connecting the two bars. Further, in some embodiments, the support bar and the supports may be omitted.

Further, the interface (e.g., second interface) 13 of the fertilizer section 20 is engaged with the interface 15 of the planter section 22. Each lower hitch connector 16 includes a vertically oriented plate 40 extending from the toolbar 23a of the fertilizer section 20. In addition, each plate 40 of the lower hitch connectors 16 includes an opening 30 configured to receive a lower hitch pin 31a. The upper hitch connector 18 also includes a pair of vertically oriented parallel plates 34 extending from the toolbar 23a of the fertilizer section 20. The parallel plates 34 form a slot configured to receive a connecting piece 21. In addition, each plate 34 of the upper hitch connector 18 includes an opening 30 configured to receive the upper hitch pin. In the illustrated embodiment, the connecting piece 21 is coupled to the upper connector 19 of the interface 15 of the planter section 22 via the upper hitch pin 31b, and the connecting piece 21 is coupled to the upper connector 18 of the interface 13 of the fertilizer section 20 via another pin. The connecting piece 21 is configured to establish a connection between the sections 20 and 22, and to facilitate adjustment of an angle of the planter section 22 relative to the fertilizer section 20.

In the illustrated embodiment, the planter section 22 has a single bar, i.e., the toolbar 23b, which extends along the longitudinal axis of the planter section 22. However, in other embodiments, the planter section 22 may include multiple bars coupled to one another by any suitable number of supports. Furthermore, in the illustrated embodiment, a length of the toolbar 23b of the planter section 22 is substantially equal to a length of the bars of the fertilizer section 20. However, in other embodiments, the length of the planter section toolbar may be significantly greater or significantly less than the length of the fertilizer bars. In addition, in the illustrated embodiment, the toolbar of the planter section is substantially parallel to the bars of the fertilizer section. However, in other embodiments, the toolbar of the planter section may be angled relative to the bars of the fertilizer section (e.g., the toolbar of the planter section and/or the bars of the fertilizer section may be angled relative to an axis extending perpendicularly to the direction of travel).

In the illustrated embodiment, spacers 28 are disposed between the fertilizer section 20 and the planter section 22 along the direction of travel. In the illustrated embodiment, four spacers 28 are distributed evenly across the longitudinal axes of the sections. However, in other embodiments there may be 1, 2, 3, 5, 6, 7, 8, 9, 10, or any other suitable number of spacers 28 between the sections. In the illustrated embodiment, each spacer 28 is connected to each section via a respective clamp 29, which loops around the toolbar of the section and connects to the spacer 28. However, in other embodiments, at least one spacer may be coupled to at least one section by other suitable type(s) of connection(s) (e.g., alone or in combination with the clamp), such as fastener connection(s), slot and groove connection(s), other suitable type(s) of connection(s), or a combination thereof. The spacers 28 are configured to establish a suitable gap between the two sections (e.g., to enable the row units and fertilizer applicators to avoid interfering with one another). However, in some embodiments, the spacers may be omitted (e.g., in embodiments having sections with a small longitudinal extent).

Figure 4:
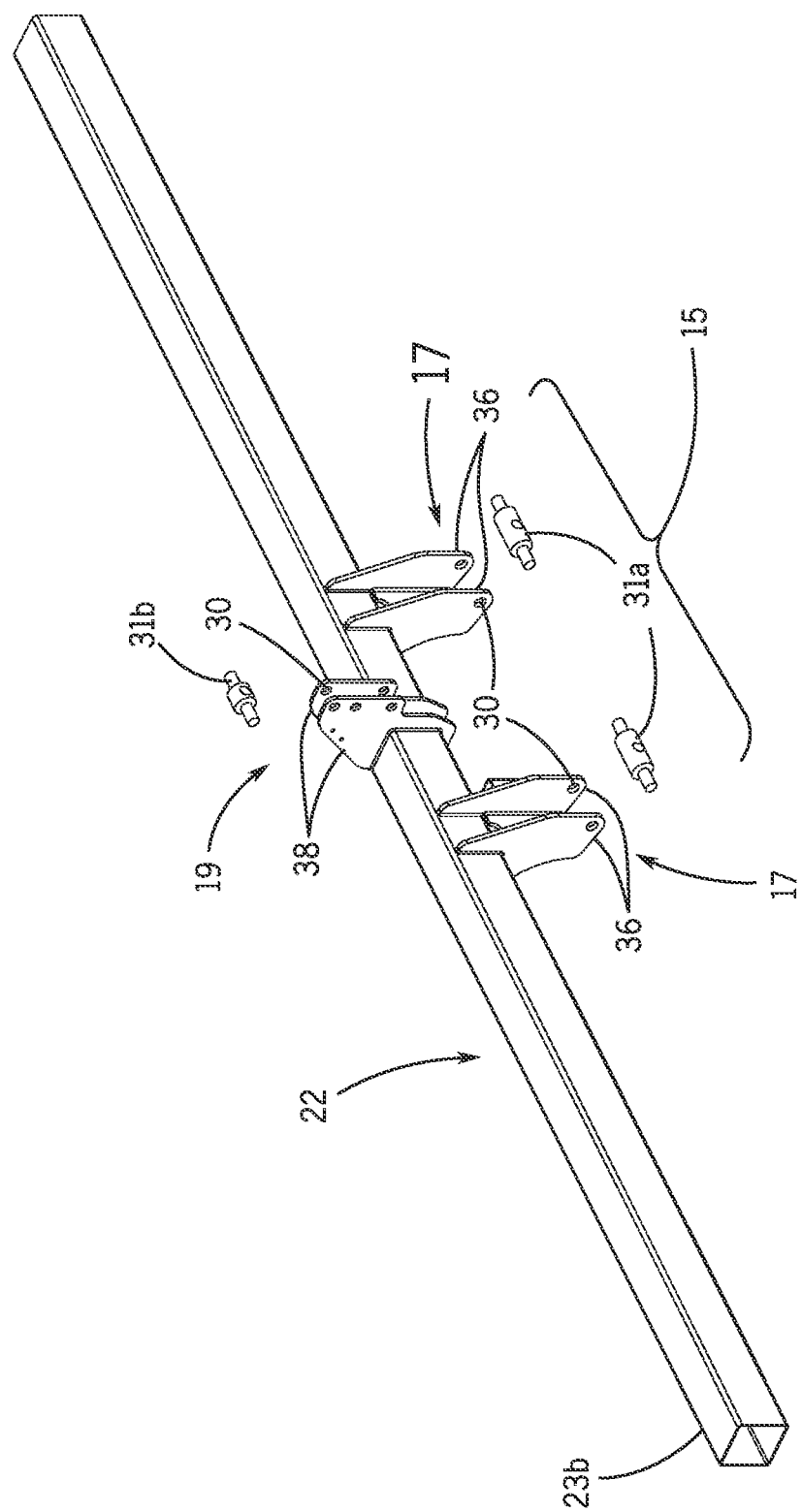
FIG. 4 is a perspective view of the agricultural implement of FIG. 1, in which the agricultural implement includes the planter section.

FIG. 4 is a perspective view of the agricultural implement 12, in which the agricultural implement includes the planter section 22. As illustrated, the agricultural implement 12 is in the three-point hitch/planter configuration. With the agricultural implement 12 in the three-point hitch/planter configuration, the fertilizer section is omitted from the agricultural implement 12. In addition, the interface 15 of the planter section 22 is configured to engage the three-point hitch of the work vehicle, similar to the manner in which the first interface of the fertilizer section is configured to engage the three-point hitch. Specifically, each lower hitch connectors 17 includes a pair of vertically oriented parallel plates 36 extending from the toolbar 23b of the planter section 22. The parallel plates 36 form a slot configured to receive an end of a respective lower lift arm. In addition, each plate 36 of the lower hitch connectors 17 includes an opening 30 configured to receive a lower hitch pin 31a, thereby connecting the lower hitch connectors 17 to the lower lift arms. The upper hitch connector 19 also includes a pair of vertically oriented parallel plates 38 extending from the toolbar 23b of the planter section 22. The parallel plates 38 form a slot configured to receive an end of the upper link 26. In addition, each plate 38 of the upper hitch connector 19 includes an opening 30 configured to receive the upper hitch pin 31b, thereby connecting the upper hitch connector 19 to the upper lift arm. While each connector includes a pair of vertically oriented parallel plates in the illustrated embodiment, in other embodiments, at least one connector may include a single plate, and/or at least one connector may include three or more plates. Furthermore, while the hitch pins couple the lower lift arms and the upper link to the connectors in the illustrated embodiment, in other embodiments, the upper link and/or at least one lower lift arm may be coupled to the respective connector(s) via bolt(s), screw(s), or the like, which fasten the fertilizer section 20 to the three-point hitch 14.

Figure 5:
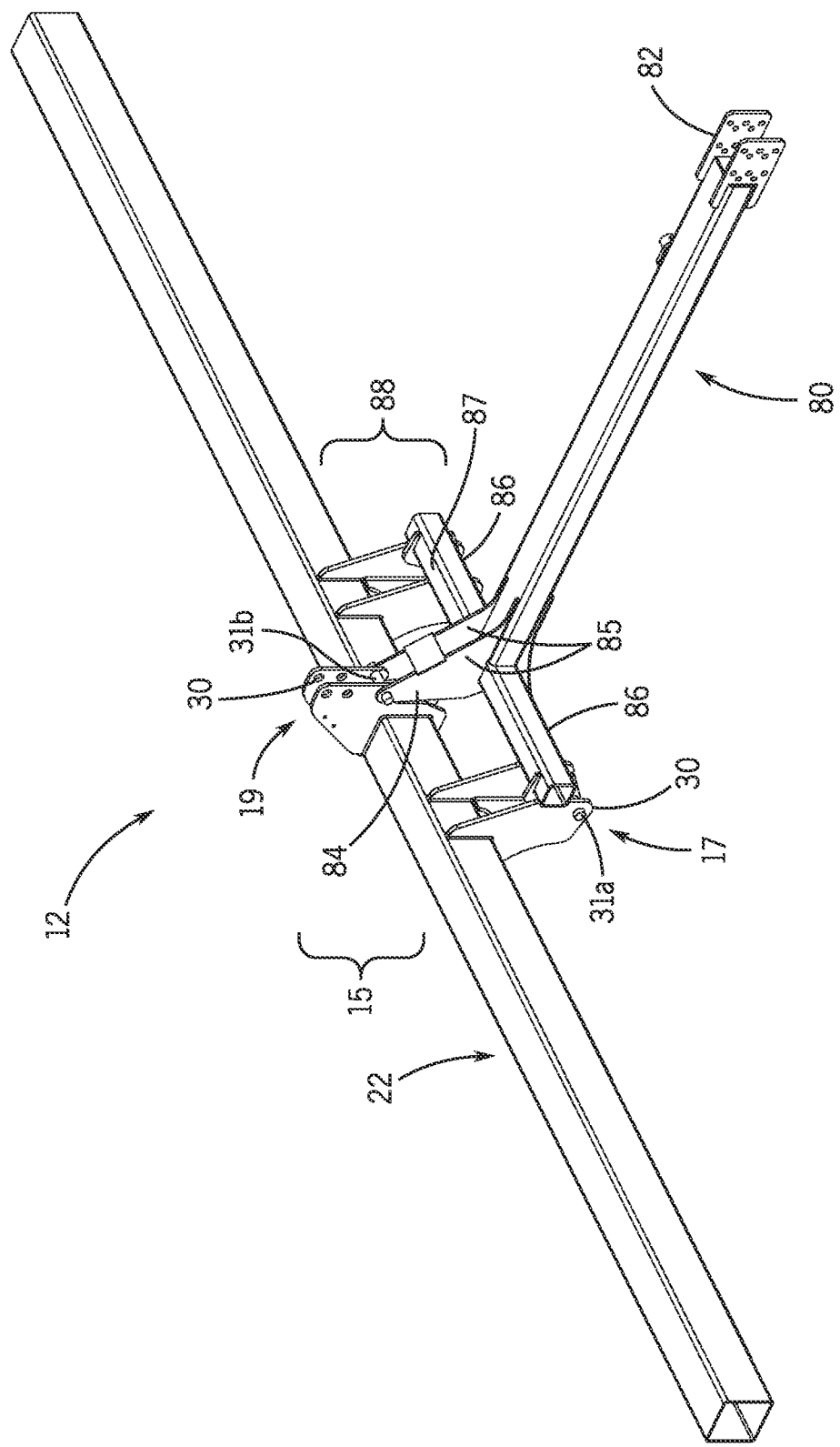
FIG. 5 is a perspective view of the agricultural implement of FIG. 1, in which the agricultural implement includes the planter section and a drawbar connector.

FIG. 5 is a perspective view of the agricultural implement 12 of FIG. 1, in which the agricultural implement includes the planter section 22 and a drawbar connector 80. As illustrated, the agricultural implement 12 is in the drawbar/planter configuration. With the agricultural implement 12 in the drawbar/planter configuration, the drawbar connector 80 is coupled to the planter section 22. In addition, the drawbar connector 80 is configured to connect to a drawbar of the work vehicle via an interface (e.g., first interface) 82 of the drawbar connector 80. For example, the interface 82 may be bolted to the drawbar of the work vehicle. However, in other embodiments, the drawbar connector may connect to the drawbar of the work vehicle in any other suitable manner (e.g., alone or in combination with the bolted connection), such as a latched connection, a tongue and groove connection, etc. Further, the drawbar connector 80 includes a second interface 88 which includes lower hitch connectors 86 and an upper hitch connector 84, which interact as a proxy for a three-point hitch. The lower hitch connectors 86 and upper hitch connector 84 extend out from the center of a T-shaped end of the drawbar connector 80, wherein each lower connector 86 is located at an end of the T, and wherein the upper hitch connector 84 extends up from the center of the end of the T. However, in other embodiments, the interface 88 may have another suitable shape, such as a triangular shape, in which support bars extend between each of the hitch connectors 84 and 86. In the illustrated embodiment, each lower connector 86 includes a vertically oriented plate 87 extending from a lower portion of the T-shaped end of the drawbar connector 80. In addition, each plate 87 of the lower connectors 86 includes an opening 30 configured to receive a lower hitch pin 31a, thereby connecting the lower connectors 86 to the lower hitch connector 17. The upper hitch connector 84 also includes a pair of vertically oriented parallel plates 85 extending from the center of the end of the T. The parallel plates 85 form a slot configured to receive an end of a respective upper hitch connector. In addition, each plate 85 of the upper connector 84 includes an opening 30 configured to receive the upper hitch pin 31b, thereby connecting the upper connectors 84 to the upper hitch connector 19.

Figure 6:
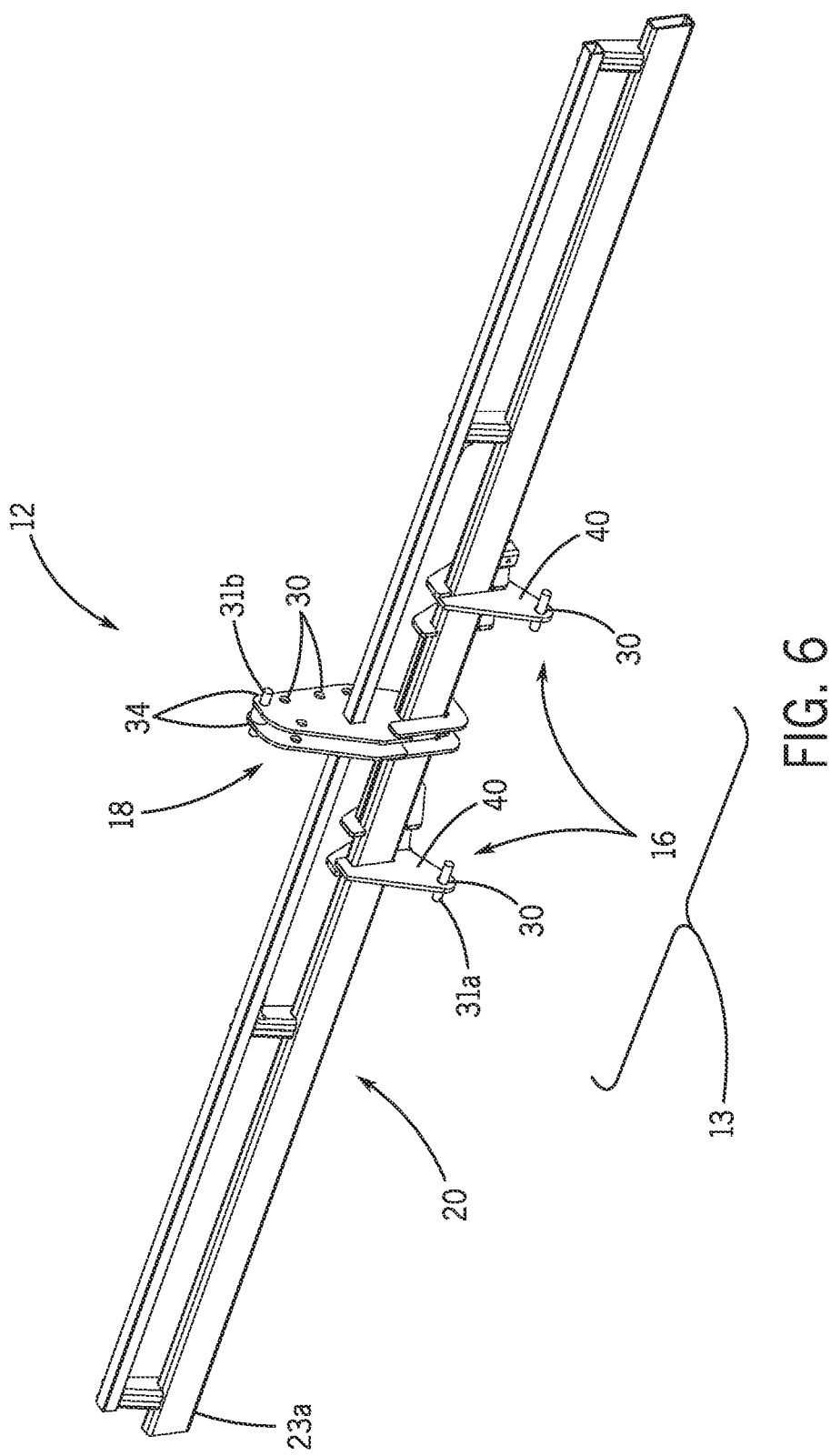
FIG. 6 is a perspective view of the fertilizer section of the agricultural implement of FIG. 1.

FIG. 6 is a perspective view of the fertilizer section of the agricultural implement 12 of FIG. 1. As discussed above, the back portion of the fertilizer section 20 is, in some embodiments, connected to the planter section via the interface 13. In the illustrated embodiment of FIG. 6, the back of the fertilizer section 20 is shown detached from the planter section. Each lower hitch connector 16 includes a vertically oriented plate 40 extending from the toolbar 23a of the fertilizer section 20. In addition, each plate 40 of the lower hitch connectors 16 includes an opening 30 configured to receive a lower hitch pin 31a, thereby connecting the lower hitch connectors 16 to the lower hitch connector of the planter section. The upper hitch connector 18 also includes a pair of vertically oriented parallel plates 34 extending from the toolbar 23a of the fertilizer section 20. The parallel plates 34 form a slot configured to receive a respective upper hitch connector of the planter section. In addition, each plate 34 of the upper hitch connector 18 includes an opening 30 configured to receive the upper hitch pin 31b, thereby connecting the upper hitch connector 18 of the fertilizer section 20 to the upper hitch connector of the planter section. Further, in some embodiments, the fertilizer section 20 could be used alone, without the planter section attached to it.

Figure 7:
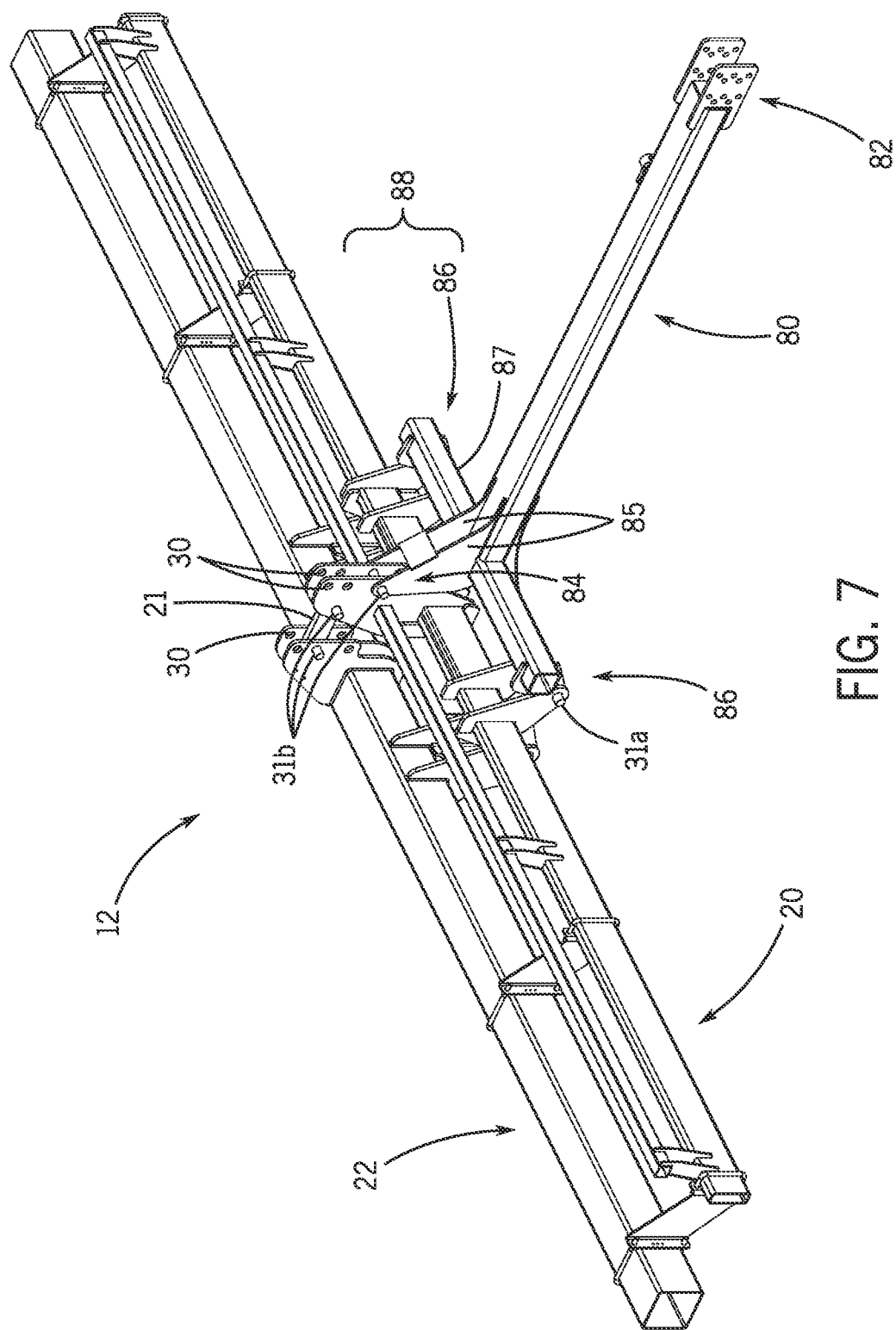
FIG. 7 is a perspective view of the agricultural implement of FIG. 1, in which the agricultural implement includes the drawbar connector, the fertilizer section, and the planter section.

FIG. 7 is a perspective view of the agricultural implement 12 of FIG. 1, in which the agricultural implement includes the drawbar connector 80, the fertilizer section 20, and the planter section 22. As illustrated, the agricultural implement 12 is in the drawbar/fertilizer configuration. With the agricultural implement 12 in the drawbar/fertilizer configuration, the drawbar connector 80 is coupled to the fertilizer section 20. In addition, the drawbar connector 80 is configured to connect to a drawbar of the work vehicle via the interface 82 of the drawbar connector 80. Specifically, the interface 82 is bolted to the drawbar of the work vehicle. However, in other embodiments, the drawbar connector can connect to the drawbar of the work vehicle in any manner of ways. Further, the drawbar connector 80 includes the interface 88, which includes the lower hitch connectors 86 and the upper hitch connector 84, which interact as a proxy for a three-point hitch. The lower hitch connectors 86 and the upper hitch connector 84 extend out from the center of a T-shaped end of the drawbar 80, wherein each lower connector 86 is located at an end of the T, and wherein the upper hitch connector 84 extends up from the center of the end of the T. However, other embodiments utilize a triangle support shape, wherein there are support bars between each of the hitch connectors 84 and 86. In the illustrated embodiment, each lower connector 86 includes a vertically oriented plate 87 extending from a lower portion of the T-shaped end of the drawbar connector 80. In addition, each plate 87 of the lower connectors 86 includes an opening 30 configured to receive a lower hitch pin 31a, thereby connecting the lower connectors 86 to the lower hitch connectors of the fertilizer section 20. The upper hitch connector 84 also includes a pair of vertically oriented parallel plates 85 extending from the center of the end of the T. The parallel plates 85 form a slot configured to receive an end of a respective upper hitch connector. In addition, each plate 85 of the upper connector 84 includes an opening 30 configured to receive the upper hitch pin 31b, thereby connecting the upper connector 84 to the upper hitch connector of the fertilizer section 20. Further, the connecting piece 21 may be utilized in certain embodiments to facilitate adjustment of an angle of the fertilizer section 20 relative to the drawbar connector 80.

FIG. 8 is a perspective view of the fertilizer section 20 and the drawbar connector 80 of the agricultural implement of FIG. 1. As described above, the interface 13 of the fertilizer section 20 is configured to engage the interface of the planter section, acting as a proxy for a three-point hitch. Similarly, the interface 88 of the drawbar connector 80 is also configured to engage the interface of the planter section in a similar manner. Due to the configuration of the second interface 13 of the fertilizer section and the interface 88 of the drawbar connector 80, the planter section may couple to the fertilizer section 20, the drawbar connector 80, or the three-point hitch of the work vehicle, depending on an operator's preference. The flexibility enabled through this interchangeability enables a single agricultural implement to be reconfigured for a number of different applications. As a result, the number of agricultural implements owned by an operator may be reduced, thereby reducing the cost of agricultural operations.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . ." or "step for (perform)ing (a function) . . .", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural implement, comprising:
a fertilizer section comprising:
a first interface configured to engage a three-point hitch; and
a second interface configured to engage an interface of a planter section, wherein the interface of the planter section is configured to engage the three-point hitch;
wherein the second interface comprises a plurality of plates, and each of the plurality of plates comprises at least one opening configured to receive a connector to connect the second interface to the interface of the planter section.

2. The agricultural implement of claim 1, wherein the fertilizer section comprises a toolbar configured to support a plurality of fertilizer applicators.

3. The agricultural implement of claim 2, wherein the fertilizer section comprises a support bar coupled to the toolbar via one or more supports.

4. The agricultural implement of claim 2, comprising at least one spacer configured to be disposed between the toolbar of the fertilizer section and a toolbar of the planter section.

5. The agricultural implement of claim 3, wherein the first interface comprises at least one lower connector attached to the toolbar of the fertilizer section and an upper connector attached to the support bar of the fertilizer section.

6. The agricultural implement of claim 5, wherein each of the at least one lower connector and the upper connector comprises a plurality of plates comprising at least one opening configured to receive a connector configured to connect the first interface to the three-point hitch.

7. The agricultural implement of claim 2, wherein the plurality of fertilizer applicators is configured to deposit agricultural product into soil.

8. An agricultural implement, comprising:
a planter section having an interface; and
a drawbar connector, wherein the drawbar connector comprises:
a first interface configured to engage a drawbar of a work vehicle; and
a second interface configured to engage the interface of the planter section, wherein the second interface comprises a plurality of plates comprising a plurality of openings, and the interface of the planter section is configured to engage a three-point hitch of the work vehicle;
wherein the first interface of the drawbar connector is located at a first end of the drawbar connector, and the second interface of the drawbar connector is located at a second end of the drawbar connector; and wherein the interface of the planter section comprises a plurality of plates comprising a plurality of openings, and the plurality of openings of the plurality of plates of the second interface is configured to receive a hitch pin configured to be received by the plurality of openings of the plurality of plates of the interface of the planter section.

9. The agricultural implement of claim 8, wherein the planter section comprises one or more row units.

10. An agricultural implement, comprising:
- a drawbar connector, wherein the drawbar connector comprises:
  - a first drawbar connector interface configured to engage a drawbar of a work vehicle; and
  - a second drawbar connector interface configured to engage an interface of a planter section of the agricultural implement, wherein the interface of the planter section is configured to engage a three-point hitch of the work vehicle; and
- a fertilizer section comprising:
  - a first fertilizer section interface configured to engage the three-point hitch and the second drawbar connector interface; and
  - a second fertilizer section interface configured to engage the interface of the planter section, wherein the second fertilizer section interface comprises a plurality of plates, and each of the plurality of plates comprises at least one opening configured to receive a connector to connect the second fertilizer section interface to the interface of the planter section.

11. The agricultural implement of claim 10, wherein the second drawbar connector interface comprises at least one lower connector and an upper connector.

12. The agricultural implement of claim 11, wherein the at least one lower connector and the upper connector comprise a plurality of plates comprising a plurality of openings.

13. The agricultural implement of claim 12, wherein the plurality of openings of the plurality of plates of the second drawbar connector interface is configured to receive a plurality of hitch pins to connect the second drawbar connector interface to the interface of the planter section or the second fertilizer section interface.

14. The agricultural implement of claim 10, comprising spacers configured to be disposed between a toolbar of the fertilizer section and a toolbar of the planter section.

15. The agricultural implement of claim 13, comprising the planter section, wherein the planter section comprises one or more rows of planters.

* * * * *